(12) United States Patent
Celikyilmaz et al.

(10) Patent No.: US 10,419,379 B2
(45) Date of Patent: Sep. 17, 2019

(54) SYSTEMS AND METHODS TO PROGRAM A COMPUTING SYSTEM TO PROCESS RELATED EVENTS VIA WORKFLOWS CONFIGURED USING A GRAPHICAL USER INTERFACE

(71) Applicant: Visa International Service Association, San Francisco, CA (US)

(72) Inventors: Ilker Celikyilmaz, Mountain View, CA (US); Joseph Spears, Hayward, CA (US)

(73) Assignee: Visa International Service Association, San Francisco, CA (US)

( * ) Notice: Subject to any disclaimer, the term of this patent is extended or adjusted under 35 U.S.C. 154(b) by 909 days.

(21) Appl. No.: 14/679,549

(22) Filed: Apr. 6, 2015

(65) Prior Publication Data

US 2015/0288637 A1    Oct. 8, 2015

Related U.S. Application Data

(60) Provisional application No. 61/976,418, filed on Apr. 7, 2014.

(51) Int. Cl.
*G06F 3/0484* (2013.01)
*H04L 12/58* (2006.01)
(Continued)

(52) U.S. Cl.
CPC .......... *H04L 51/16* (2013.01); *G06F 3/04842* (2013.01); *G06F 3/04847* (2013.01); *G06F 8/34* (2013.01); *G06F 8/36* (2013.01)

(58) Field of Classification Search
CPC ... H04L 51/16; G06F 3/04842; G06F 3/04847
See application file for complete search history.

(56) References Cited

U.S. PATENT DOCUMENTS

| 4,613,904 A | 9/1986 | Lurie |
| 5,401,946 A | 3/1995 | Weinblatt |

(Continued)

FOREIGN PATENT DOCUMENTS

| JP | 2000357204 | 12/2000 |
| JP | 2001501328 | 1/2001 |

(Continued)

OTHER PUBLICATIONS

Cashmore, Pete, "YouTube Ads: You Hate Em," available at http://mashable.com/2009/04/05/youtube-ads-youhate-em/#, Apr. 5, 2009.

(Continued)

*Primary Examiner* — Jennifer N To
*Assistant Examiner* — Ashley M Fortino
(74) *Attorney, Agent, or Firm* — The Webb Law Firm

(57) ABSTRACT

Systems and methods configured to program processing logic of related events via the use of autonomous components connected via a message board, a graphical user interface for specifying a workflow among selected autonomous components, where each of the autonomous components is configured to process a pre-determined type of events, and the autonomous components are configured to monitor a message board for relevant messages, retrieve respective messages from the message board, process the retrieved messages independent of other autonomous components, and provide processing results via posting messages on the message board. The messages posted on the message board identify the relevant workflows to cause the autonomous components to process data in accordance with the workflows.

20 Claims, 9 Drawing Sheets

(51) Int. Cl.
*G06F 8/34* (2018.01)
*G06F 8/36* (2018.01)

(56) References Cited

U.S. PATENT DOCUMENTS

| | | |
|---|---|---|
| 5,592,560 A | 1/1997 | Deaton et al. |
| 5,604,921 A | 2/1997 | Alanara |
| 5,621,812 A | 4/1997 | Deaton et al. |
| 5,638,457 A | 6/1997 | Deaton et al. |
| 5,684,990 A | 11/1997 | Boothby |
| 5,687,322 A | 11/1997 | Deaton et al. |
| 5,710,886 A | 1/1998 | Christensen et al. |
| 5,745,036 A | 4/1998 | Clare |
| 5,870,030 A | 2/1999 | DeLuca et al. |
| 5,923,016 A | 7/1999 | Fredregill et al. |
| 5,924,080 A | 7/1999 | Johnson |
| 5,974,396 A | 10/1999 | Anderson et al. |
| 6,035,280 A | 3/2000 | Christensen |
| 6,067,529 A | 5/2000 | Ray et al. |
| 6,070,147 A | 5/2000 | Harms et al. |
| 6,119,101 A | 9/2000 | Peckover |
| 6,216,129 B1 | 4/2001 | Eldering |
| 6,222,914 B1 | 4/2001 | McMullin |
| 6,282,522 B1 | 8/2001 | Davis et al. |
| 6,285,983 B1 | 9/2001 | Jenkins |
| 6,292,786 B1 | 9/2001 | Deaton et al. |
| 6,298,330 B1 | 10/2001 | Gardenswartz et al. |
| 6,307,958 B1 | 10/2001 | Deaton et al. |
| 6,313,732 B1 | 11/2001 | DeLuca et al. |
| 6,318,631 B1 | 11/2001 | Halperin |
| 6,318,911 B1 | 11/2001 | Kitahara |
| 6,321,201 B1 | 11/2001 | Dahl |
| 6,332,126 B1 | 12/2001 | Peirce et al. |
| 6,334,108 B1 | 12/2001 | Deaton et al. |
| 6,334,110 B1 | 12/2001 | Walter et al. |
| 6,377,935 B1 | 4/2002 | Deaton et al. |
| 6,505,046 B1 | 1/2003 | Baker |
| 6,505,168 B1 | 1/2003 | Rothman et al. |
| 6,519,571 B1 | 2/2003 | Guheen et al. |
| 6,606,745 B2 | 8/2003 | Maggio |
| 6,647,257 B2 | 11/2003 | Owensby |
| 6,647,269 B2 | 11/2003 | Hendrey et al. |
| 6,685,093 B2 | 2/2004 | Challa et al. |
| 6,736,322 B2 | 5/2004 | Gobburu et al. |
| 6,749,120 B2 | 6/2004 | Hung et al. |
| 6,775,539 B2 | 8/2004 | Deshpande |
| 6,856,992 B2 | 2/2005 | Britton et al. |
| 6,877,665 B2 | 4/2005 | Challa et al. |
| 6,901,406 B2 | 5/2005 | Nabe et al. |
| 6,912,398 B1 | 6/2005 | Domnitz |
| 6,922,686 B2 | 7/2005 | Okamoto et al. |
| 6,938,022 B1 | 8/2005 | Singhal |
| 6,941,376 B2 | 9/2005 | Mitchell et al. |
| 6,996,560 B1 | 2/2006 | Choi et al. |
| 7,003,476 B1 | 2/2006 | Samra et al. |
| 7,013,286 B1 | 3/2006 | Aggarwal et al. |
| 7,024,374 B1 | 4/2006 | Day et al. |
| 7,024,409 B2 | 4/2006 | Iyengar |
| 7,028,906 B2 | 4/2006 | Challa et al. |
| 7,035,855 B1 | 4/2006 | Kilger et al. |
| 7,039,599 B2 | 5/2006 | Merriman et al. |
| 7,062,510 B1 | 6/2006 | Eldering |
| 7,072,847 B2 | 7/2006 | Ulenas et al. |
| 7,107,249 B2 | 9/2006 | Dively et al. |
| 7,120,590 B1 | 10/2006 | Eisen et al. |
| 7,158,943 B2 | 1/2007 | van der Riet |
| 7,158,955 B2 | 1/2007 | Diveley et al. |
| 7,165,037 B2 | 1/2007 | Lazarus et al. |
| 7,177,822 B2 | 2/2007 | Mahmood et al. |
| 7,181,412 B1 | 2/2007 | Fulgoni et al. |
| 7,194,422 B1 | 3/2007 | Killick |
| 7,225,142 B1 | 5/2007 | Apte et al. |
| 7,231,416 B1* | 6/2007 | Busuioc .............. G06Q 30/02 709/201 |
| 7,257,545 B1 | 8/2007 | Hung |
| 7,260,837 B2 | 8/2007 | Abraham et al. |
| 7,264,152 B2 | 9/2007 | Tsuei et al. |
| 7,269,578 B2 | 9/2007 | Sweeney |
| 7,299,194 B1 | 11/2007 | Manganaris et al. |
| 7,308,254 B1 | 12/2007 | Rissanen |
| 7,328,169 B2 | 2/2008 | Temares et al. |
| 7,330,110 B1 | 2/2008 | Heintzman et al. |
| 7,337,127 B1 | 2/2008 | Smith et al. |
| 7,340,438 B2 | 3/2008 | Nordman et al. |
| 7,360,251 B2 | 4/2008 | Spalink et al. |
| 7,373,311 B2 | 5/2008 | Lambert et al. |
| 7,424,439 B1 | 9/2008 | Fayyad et al. |
| 7,424,441 B2 | 9/2008 | George et al. |
| 7,444,658 B1 | 10/2008 | Matz et al. |
| 7,467,106 B1 | 12/2008 | Levine et al. |
| 7,490,052 B2 | 2/2009 | Kilger et al. |
| 7,493,655 B2 | 2/2009 | Brown |
| 7,526,485 B2 | 4/2009 | Hagan et al. |
| 7,533,038 B2 | 5/2009 | Blume et al. |
| 7,536,360 B2 | 5/2009 | Stolfo et al. |
| 7,552,069 B2 | 6/2009 | Kepecs |
| 7,562,030 B1 | 7/2009 | Shapira et al. |
| 7,578,435 B2 | 8/2009 | Suk |
| 7,613,628 B2 | 11/2009 | Ariff et al. |
| 7,668,785 B1 | 2/2010 | Hammad |
| 7,729,977 B2 | 6/2010 | Xiao et al. |
| 7,792,518 B2 | 9/2010 | Trioano et al. |
| 7,882,209 B1 | 2/2011 | Eslambolchi et al. |
| 7,937,291 B2 | 5/2011 | Carlson et al. |
| 7,970,705 B2 | 6/2011 | Patterson |
| 8,019,685 B2 | 9/2011 | Patterson |
| 8,099,318 B2 | 1/2012 | Moukas et al. |
| 8,103,588 B2 | 1/2012 | Patterson |
| 8,229,819 B2 | 7/2012 | Ransom et al. |
| 8,311,845 B2 | 11/2012 | Vengroff et al. |
| 8,341,038 B1 | 12/2012 | Rolf et al. |
| 8,478,692 B2 | 7/2013 | Carlson et al. |
| 8,682,719 B2 | 3/2014 | Laramy et al. |
| 2001/0027413 A1 | 10/2001 | Bhutta |
| 2001/0049620 A1 | 12/2001 | Blasko |
| 2001/0054003 A1 | 12/2001 | Chien et al. |
| 2002/0002597 A1 | 1/2002 | Morrell, Jr. |
| 2002/0004733 A1 | 1/2002 | Addante |
| 2002/0004754 A1 | 1/2002 | Gardenswartz et al. |
| 2002/0042738 A1 | 4/2002 | Srinivasan et al. |
| 2002/0046187 A1 | 4/2002 | Vargas et al. |
| 2002/0053076 A1 | 5/2002 | Landesmann |
| 2002/0059100 A1 | 5/2002 | Shore |
| 2002/0060246 A1 | 5/2002 | Gobburu et al. |
| 2002/0065713 A1 | 5/2002 | Awada et al. |
| 2002/0065723 A1 | 5/2002 | Anderson et al. |
| 2002/0070278 A1 | 6/2002 | Hung et al. |
| 2002/0077871 A1 | 6/2002 | Udelhoven et al. |
| 2002/0082918 A1 | 6/2002 | Warwick |
| 2002/0091569 A1 | 7/2002 | Kitaura et al. |
| 2002/0099649 A1 | 7/2002 | Lee et al. |
| 2002/0102993 A1 | 8/2002 | Hendrey et al. |
| 2002/0103703 A1 | 8/2002 | Spetalnick |
| 2002/0123928 A1 | 9/2002 | Eldering et al. |
| 2002/0128916 A1 | 9/2002 | Beinecke, III |
| 2002/0138346 A1 | 9/2002 | Kodaka et al. |
| 2002/0174013 A1 | 11/2002 | Freeman et al. |
| 2003/0046153 A1 | 3/2003 | Robibero |
| 2003/0047602 A1 | 3/2003 | Iida et al. |
| 2003/0058261 A1 | 3/2003 | Challa et al. |
| 2003/0093314 A1 | 5/2003 | Leung et al. |
| 2003/0191832 A1 | 10/2003 | Satyavolu et al. |
| 2003/0212595 A1 | 11/2003 | Antonucci |
| 2003/0225618 A1 | 12/2003 | Hessburg et al. |
| 2003/0230630 A1 | 12/2003 | Whipple et al. |
| 2004/0019518 A1 | 1/2004 | Abraham et al. |
| 2004/0054575 A1 | 3/2004 | Marshall |
| 2004/0054581 A1 | 3/2004 | Redford et al. |
| 2004/0054591 A1 | 3/2004 | Spaeth et al. |
| 2004/0093512 A1 | 5/2004 | Sample |
| 2004/0122735 A1 | 6/2004 | Meshkin |
| 2004/0144839 A1 | 7/2004 | Warwick |
| 2004/0148224 A1 | 7/2004 | Gauthier et al. |
| 2004/0167815 A1 | 8/2004 | DeLaHunt |

(56) References Cited

U.S. PATENT DOCUMENTS

| | | |
|---|---|---|
| 2004/0193685 A1 | 9/2004 | Proehl |
| 2004/0225509 A1 | 11/2004 | Andre |
| 2004/0225603 A1 | 11/2004 | Allen et al. |
| 2004/0267611 A1 | 12/2004 | Hoerenz |
| 2005/0055275 A1 | 3/2005 | Newman et al. |
| 2005/0066304 A1* | 3/2005 | Tattrie .................. G06F 8/20 717/101 |
| 2005/0071225 A1 | 3/2005 | Bortolin et al. |
| 2005/0071227 A1 | 3/2005 | Hammad et al. |
| 2005/0071235 A1 | 3/2005 | Nguyen et al. |
| 2005/0125342 A1 | 6/2005 | Schiff |
| 2005/0131761 A1 | 6/2005 | Trika et al. |
| 2005/0133590 A1 | 6/2005 | Rettenmyer et al. |
| 2005/0144074 A1 | 6/2005 | Fredregill et al. |
| 2005/0160002 A1 | 7/2005 | Roetter et al. |
| 2005/0210387 A1 | 9/2005 | Alagappan et al. |
| 2005/0216334 A1 | 9/2005 | Mehrabani-Farsi |
| 2005/0216823 A1 | 9/2005 | Petersen et al. |
| 2005/0240474 A1 | 10/2005 | Li |
| 2005/0242179 A1 | 11/2005 | Warwick |
| 2005/0267812 A1 | 12/2005 | Jensen et al. |
| 2006/0002189 A1 | 1/2006 | Berkman |
| 2006/0004613 A1 | 1/2006 | Roller et al. |
| 2006/0053056 A1 | 3/2006 | Alspach-Goss et al. |
| 2006/0085260 A1 | 4/2006 | Yamagishi |
| 2006/0085263 A1 | 4/2006 | Greer et al. |
| 2006/0111967 A1 | 5/2006 | Forbes |
| 2006/0122921 A1 | 6/2006 | Comerford et al. |
| 2006/0143071 A1 | 6/2006 | Hofmann |
| 2006/0143075 A1 | 6/2006 | Carr et al. |
| 2006/0161527 A1 | 7/2006 | Dwork et al. |
| 2006/0167730 A1* | 7/2006 | Calderone ............ G06Q 10/06 709/246 |
| 2006/0167818 A1 | 7/2006 | Wentker et al. |
| 2006/0178957 A1 | 8/2006 | LeClaire |
| 2006/0190337 A1 | 8/2006 | Ayers, Jr. et al. |
| 2006/0212900 A1 | 9/2006 | Ismail et al. |
| 2006/0235746 A1 | 10/2006 | Hammond et al. |
| 2006/0289631 A1 | 12/2006 | Stretch et al. |
| 2006/0293948 A1 | 12/2006 | Weinblatt |
| 2006/0293959 A1 | 12/2006 | Hogan |
| 2007/0038516 A1 | 2/2007 | Apple et al. |
| 2007/0045405 A1 | 3/2007 | Rothschild |
| 2007/0055597 A1 | 3/2007 | Patel et al. |
| 2007/0067267 A1 | 3/2007 | Ives |
| 2007/0067297 A1 | 3/2007 | Kublickis |
| 2007/0084917 A1 | 4/2007 | Fajkowski |
| 2007/0100691 A1 | 5/2007 | Patterson |
| 2007/0106556 A1 | 5/2007 | Edwards et al. |
| 2007/0124201 A1 | 5/2007 | Hu et al. |
| 2007/0136131 A1 | 6/2007 | Mankoff |
| 2007/0156470 A1 | 7/2007 | Granucci et al. |
| 2007/0162377 A1 | 7/2007 | Williams |
| 2007/0174295 A1 | 7/2007 | Abraham et al. |
| 2007/0192121 A1 | 8/2007 | Routson |
| 2007/0192122 A1 | 8/2007 | Routson et al. |
| 2007/0208671 A1 | 9/2007 | Brown et al. |
| 2007/0219865 A1 | 9/2007 | Leining |
| 2007/0219866 A1 | 9/2007 | Wolf et al. |
| 2007/0226056 A1 | 9/2007 | Belanger et al. |
| 2007/0226061 A1 | 9/2007 | Chen et al. |
| 2007/0239521 A1 | 10/2007 | Khadpe et al. |
| 2007/0239532 A1 | 10/2007 | Benson et al. |
| 2007/0241189 A1 | 10/2007 | Slavin et al. |
| 2007/0244741 A1 | 10/2007 | Blume et al. |
| 2007/0260736 A1 | 11/2007 | Miller |
| 2007/0265920 A1 | 11/2007 | Bistriceanu et al. |
| 2007/0265921 A1 | 11/2007 | Rempe et al. |
| 2007/0265923 A1 | 11/2007 | Krassner et al. |
| 2007/0282681 A1 | 12/2007 | Shubert et al. |
| 2008/0004884 A1 | 1/2008 | Flake et al. |
| 2008/0016017 A1* | 1/2008 | Biazetti ................ G06N 5/02 706/45 |
| 2008/0021784 A1 | 1/2008 | Hessburg et al. |
| 2008/0021785 A1 | 1/2008 | Hessburg et al. |
| 2008/0027810 A1 | 1/2008 | Lerner et al. |
| 2008/0040229 A1 | 2/2008 | Gholston |
| 2008/0059302 A1 | 3/2008 | Fordyce, III et al. |
| 2008/0059303 A1 | 3/2008 | Fordyce |
| 2008/0059306 A1 | 3/2008 | Fordyce et al. |
| 2008/0059307 A1 | 3/2008 | Fordyce, III et al. |
| 2008/0071587 A1 | 3/2008 | Granucci et al. |
| 2008/0071680 A1 | 3/2008 | Sheets |
| 2008/0077487 A1 | 3/2008 | Davis et al. |
| 2008/0082393 A1 | 4/2008 | Ozzie et al. |
| 2008/0082418 A1 | 4/2008 | Fordyce et al. |
| 2008/0103887 A1 | 5/2008 | Oldham et al. |
| 2008/0103968 A1 | 5/2008 | Bies et al. |
| 2008/0109467 A1 | 5/2008 | Brookins et al. |
| 2008/0120182 A1 | 5/2008 | Arnold et al. |
| 2008/0120218 A1 | 5/2008 | Reid et al. |
| 2008/0133345 A1 | 6/2008 | Cordery et al. |
| 2008/0133351 A1 | 6/2008 | White et al. |
| 2008/0133366 A1 | 6/2008 | Evans et al. |
| 2008/0134228 A1 | 6/2008 | Dion et al. |
| 2008/0154654 A1 | 6/2008 | Niessen et al. |
| 2008/0154703 A1 | 6/2008 | Flake et al. |
| 2008/0154704 A1 | 6/2008 | Flake et al. |
| 2008/0154727 A1 | 6/2008 | Carlson |
| 2008/0162258 A1 | 7/2008 | Kala et al. |
| 2008/0162269 A1 | 7/2008 | Gilbert |
| 2008/0163257 A1 | 7/2008 | Carlson et al. |
| 2008/0167000 A1 | 7/2008 | Wentker et al. |
| 2008/0167961 A1 | 7/2008 | Wentker et al. |
| 2008/0167991 A1 | 7/2008 | Carlson et al. |
| 2008/0167992 A1 | 7/2008 | Kokernak et al. |
| 2008/0177602 A1 | 7/2008 | Sopher et al. |
| 2008/0183480 A1 | 7/2008 | Carlson et al. |
| 2008/0184117 A1 | 7/2008 | Alsbury et al. |
| 2008/0195465 A1 | 8/2008 | Redmond et al. |
| 2008/0195473 A1 | 8/2008 | Laramy et al. |
| 2008/0201226 A1 | 8/2008 | Carlson et al. |
| 2008/0201472 A1 | 8/2008 | Bistriceanu et al. |
| 2008/0215429 A1 | 9/2008 | Ramer et al. |
| 2008/0215436 A1 | 9/2008 | Roberts |
| 2008/0217397 A1 | 9/2008 | Degliantoni et al. |
| 2008/0221972 A1 | 9/2008 | Megdal et al. |
| 2008/0222038 A1 | 9/2008 | Eden et al. |
| 2008/0228563 A1 | 9/2008 | Zellner et al. |
| 2008/0228582 A1 | 9/2008 | Fordyce et al. |
| 2008/0235091 A1 | 9/2008 | Holliday |
| 2008/0235243 A1 | 9/2008 | Lee et al. |
| 2008/0242317 A1 | 10/2008 | Abhyanker |
| 2008/0248815 A1 | 10/2008 | Busch |
| 2008/0262915 A1 | 10/2008 | Gojkovic et al. |
| 2008/0300973 A1 | 12/2008 | DeWitt et al. |
| 2008/0313011 A1 | 12/2008 | Rose et al. |
| 2008/0318559 A1 | 12/2008 | Porco |
| 2008/0319843 A1 | 12/2008 | Moser et al. |
| 2008/0319847 A1 | 12/2008 | Shepard |
| 2008/0319889 A1 | 12/2008 | Hammad |
| 2008/0320512 A1 | 12/2008 | Knight |
| 2009/0006183 A1 | 1/2009 | Paintin et al. |
| 2009/0006203 A1 | 1/2009 | Fordyce, III et al. |
| 2009/0006363 A1 | 1/2009 | Canny et al. |
| 2009/0018895 A1 | 1/2009 | Weinblatt et al. |
| 2009/0030793 A1 | 1/2009 | Fordyce, III |
| 2009/0043593 A1 | 2/2009 | Herbrich et al. |
| 2009/0070207 A1 | 3/2009 | Engel et al. |
| 2009/0070219 A1 | 3/2009 | D'Angelo et al. |
| 2009/0070225 A1 | 3/2009 | Matz et al. |
| 2009/0076896 A1 | 3/2009 | DeWitt et al. |
| 2009/0076925 A1 | 3/2009 | DeWitt et al. |
| 2009/0081990 A1 | 3/2009 | Granucci et al. |
| 2009/0112703 A1 | 4/2009 | Brown |
| 2009/0112721 A1 | 4/2009 | Hammad et al. |
| 2009/0119160 A1 | 5/2009 | Woda et al. |
| 2009/0119167 A1 | 5/2009 | Kendall et al. |
| 2009/0119170 A1 | 5/2009 | Hammad et al. |
| 2009/0132347 A1 | 5/2009 | Anderson et al. |
| 2009/0132365 A1 | 5/2009 | Gruenhagen et al. |
| 2009/0132366 A1 | 5/2009 | Lam et al. |
| 2009/0144201 A1 | 6/2009 | Gierkink et al. |
| 2009/0150211 A1 | 6/2009 | Bayne |

(56) References Cited

U.S. PATENT DOCUMENTS

| | | |
|---|---|---|
| 2009/0157511 A1 | 6/2009 | Spinnell et al. |
| 2009/0171747 A1 | 7/2009 | Lanning et al. |
| 2009/0172551 A1 | 7/2009 | Kane et al. |
| 2009/0172728 A1 | 7/2009 | Shkedi et al. |
| 2009/0182634 A1 | 7/2009 | Park et al. |
| 2009/0192882 A1 | 7/2009 | Narahashi et al. |
| 2009/0203387 A1 | 8/2009 | Wold et al. |
| 2009/0216579 A1 | 8/2009 | Zen et al. |
| 2009/0216616 A1 | 8/2009 | Wang et al. |
| 2009/0222323 A1 | 9/2009 | Kelly et al. |
| 2009/0222348 A1 | 9/2009 | Ransom et al. |
| 2009/0234708 A1 | 9/2009 | Heiser, II et al. |
| 2009/0234711 A1 | 9/2009 | Ramer et al. |
| 2009/0234737 A1 | 9/2009 | Sarelson et al. |
| 2009/0248496 A1 | 10/2009 | Hueter et al. |
| 2009/0248497 A1 | 10/2009 | Hueter |
| 2009/0248511 A1 | 10/2009 | Mehta et al. |
| 2009/0249384 A1 | 10/2009 | Fang et al. |
| 2009/0254414 A1 | 10/2009 | Schwarz et al. |
| 2009/0259518 A1 | 10/2009 | Harvey et al. |
| 2009/0271275 A1 | 10/2009 | Regmi et al. |
| 2009/0271305 A1 | 10/2009 | Lal et al. |
| 2009/0271327 A1 | 10/2009 | Lal et al. |
| 2009/0276304 A1 | 11/2009 | Dorr |
| 2009/0299941 A1 | 12/2009 | McColgan et al. |
| 2009/0327151 A1 | 12/2009 | Carlson et al. |
| 2010/0017275 A1 | 1/2010 | Carlson et al. |
| 2010/0049588 A1 | 2/2010 | Debow |
| 2010/0049620 A1 | 2/2010 | Debow |
| 2010/0057549 A1 | 3/2010 | Boal |
| 2010/0057553 A1 | 3/2010 | Ameiss et al. |
| 2010/0082420 A1 | 4/2010 | Trifiletti et al. |
| 2010/0106568 A1 | 4/2010 | Grimes |
| 2010/0106569 A1 | 4/2010 | Grimes |
| 2010/0106570 A1 | 4/2010 | Radu et al. |
| 2010/0114677 A1 | 5/2010 | Carlson et al. |
| 2010/0114683 A1 | 5/2010 | Wessels et al. |
| 2010/0114686 A1 | 5/2010 | Carlson et al. |
| 2010/0125490 A1 | 5/2010 | Kiciman et al. |
| 2010/0138838 A1 | 6/2010 | Lin et al. |
| 2010/0145786 A1 | 6/2010 | Fordyce, III et al. |
| 2010/0174596 A1 | 7/2010 | Gilman et al. |
| 2010/0174623 A1 | 7/2010 | McPhie et al. |
| 2010/0211694 A1 | 8/2010 | Razmov et al. |
| 2010/0274566 A1 | 10/2010 | Carlson |
| 2010/0274625 A1 | 10/2010 | Carlson |
| 2010/0274627 A1 | 10/2010 | Carlson |
| 2010/0274653 A1 | 10/2010 | Hammad |
| 2010/0280880 A1 | 11/2010 | Faith et al. |
| 2010/0280881 A1 | 11/2010 | Faith et al. |
| 2010/0280882 A1 | 11/2010 | Faith et al. |
| 2010/0280914 A1 | 11/2010 | Carlson |
| 2010/0280927 A1 | 11/2010 | Faith et al. |
| 2010/0280950 A1 | 11/2010 | Faith et al. |
| 2010/0306029 A1 | 12/2010 | Jolley |
| 2010/0306032 A1 | 12/2010 | Jolley |
| 2010/0325047 A1 | 12/2010 | Carlson et al. |
| 2010/0325048 A1 | 12/2010 | Carlson et al. |
| 2011/0022448 A1 | 1/2011 | Strock et al. |
| 2011/0029363 A1 | 2/2011 | Gillenson et al. |
| 2011/0054981 A1 | 3/2011 | Faith et al. |
| 2011/0125509 A1 | 5/2011 | Lidstrom et al. |
| 2011/0125565 A1 | 5/2011 | MacIlwaine et al. |
| 2011/0161150 A1 | 6/2011 | Steffens et al. |
| 2011/0208575 A1 | 8/2011 | Bansal et al. |
| 2011/0231235 A1 | 9/2011 | MacIlwaine et al. |
| 2011/0231258 A1 | 9/2011 | Winters |
| 2011/0270719 A1 | 11/2011 | Hollars et al. |
| 2011/0288906 A1 | 11/2011 | Thomas et al. |
| 2011/0288918 A1 | 11/2011 | Cervenka et al. |
| 2011/0288922 A1 | 11/2011 | Thomas et al. |
| 2011/0288924 A1 | 11/2011 | Thomas et al. |
| 2011/0288925 A1 | 11/2011 | Thomas et al. |
| 2011/0295670 A1 | 12/2011 | Thomas et al. |
| 2011/0295671 A1 | 12/2011 | Thomas et al. |
| 2011/0302011 A1 | 12/2011 | Yoder et al. |
| 2011/0307318 A1 | 12/2011 | LaPorte et al. |
| 2012/0059702 A1 | 3/2012 | Yoder et al. |
| 2012/0066062 A1 | 3/2012 | Yoder et al. |
| 2012/0066064 A1 | 3/2012 | Yoder et al. |
| 2012/0072997 A1 | 3/2012 | Carlson et al. |
| 2012/0078697 A1 | 3/2012 | Carlson et al. |
| 2012/0078699 A1 | 3/2012 | Carlson et al. |
| 2012/0109730 A1 | 5/2012 | Yoder et al. |
| 2012/0130859 A1 | 5/2012 | Wolfe et al. |
| 2012/0136704 A1 | 5/2012 | Carlson et al. |
| 2012/0150609 A1 | 6/2012 | Walker et al. |
| 2012/0191525 A1 | 7/2012 | Singh et al. |
| 2012/0215637 A1 | 8/2012 | Hermann |
| 2012/0239498 A1 | 9/2012 | Ramer et al. |
| 2012/0244948 A1 | 9/2012 | Dhillon et al. |
| 2012/0259695 A1 | 10/2012 | Glassman et al. |
| 2012/0259842 A1 | 10/2012 | Oman et al. |
| 2012/0271689 A1 | 10/2012 | Etheredge et al. |
| 2012/0271691 A1 | 10/2012 | Hammad et al. |
| 2012/0271697 A1 | 10/2012 | Gilman et al. |
| 2012/0271706 A1 | 10/2012 | Ransom et al. |
| 2012/0278173 A1 | 11/2012 | Vaidyanathan et al. |
| 2012/0290950 A1 | 11/2012 | Rapaport et al. |
| 2012/0303425 A1 | 11/2012 | Katzin et al. |
| 2012/0310831 A1* | 12/2012 | Harris .................. G06Q 30/02 705/39 |
| 2012/0310838 A1 | 12/2012 | Harris et al. |
| 2012/0323664 A1 | 12/2012 | Klems |
| 2013/0006709 A1 | 1/2013 | Kosta |
| 2013/0132205 A1 | 5/2013 | Harris |
| 2013/0268342 A1 | 10/2013 | Tune et al. |
| 2014/0074581 A1 | 3/2014 | Johnson et al. |

FOREIGN PATENT DOCUMENTS

| | | |
|---|---|---|
| JP | 2009501891 | 1/2009 |
| KR | 1020010096672 | 11/2001 |
| KR | 1020030008894 | 1/2003 |
| KR | 1020040045622 | 6/2004 |
| KR | 20040107715 | 12/2004 |
| KR | 1020050113156 | 12/2005 |
| KR | 20070030415 | 3/2007 |
| KR | 1020080002731 | 1/2008 |
| KR | 20080104398 | 12/2008 |
| WO | 1999022328 | 5/1999 |
| WO | 1999050775 | 10/1999 |
| WO | 2000003328 | 1/2000 |
| WO | 2000060435 | 10/2000 |
| WO | 2000062231 | 10/2000 |
| WO | 2001037183 | 5/2001 |
| WO | 2001039023 | 5/2001 |
| WO | 2001057758 | 8/2001 |
| WO | 2001093161 | 12/2001 |
| WO | 2002005116 | 1/2002 |
| WO | 2002014985 | 2/2002 |
| WO | 2002019229 | 3/2002 |
| WO | 2002042970 | 5/2002 |
| WO | 2002071187 | 9/2002 |
| WO | 2003025695 | 3/2003 |
| WO | 2003081376 | 10/2003 |
| WO | 2005001631 | 1/2005 |
| WO | 2005072382 | 8/2005 |
| WO | 2005076181 | 8/2005 |
| WO | 2006028739 | 3/2006 |
| WO | 2006126205 | 11/2006 |
| WO | 2007131258 | 11/2007 |
| WO | 2007136221 | 11/2007 |
| WO | 2008013945 | 1/2008 |
| WO | 2008023912 | 2/2008 |
| WO | 2008055217 | 5/2008 |
| WO | 2008064343 | 5/2008 |
| WO | 2008067543 | 6/2008 |
| WO | 2008144643 | 11/2008 |
| WO | 2009144010 | 12/2009 |
| WO | 2010036915 | 4/2010 |

(56) References Cited

FOREIGN PATENT DOCUMENTS

| WO | 2010141270 | 12/2010 |
|----|------------|---------|
| WO | 2012040270 | 3/2012  |

OTHER PUBLICATIONS

Credit Card Finder: "Compare Cash Back Credit Cards and Credit Card Offers"; http://www.plasticrewards.com/, 2009, 1 page.
Credit Card Finder: "Cash Back Reward Credit Cards"; http://www.plasticrewards.com/creditcard/cash-back-reward/, 2009, 3 pages.
Credit Card Finder: "Airline Miles Reward Credit Cards"; http://www.plasticrewards.com/airline-miles-reward/, 2009, 2 pages.
Credit Card Finder: "Gas Reward Credit Cards"; http://www.plasticrewards.com/creditcard/gas-reward/, 2009, 3 pages.
Credit Card Finder: "Travel Reward Credit Cards"; http://www.plasticrewards.com/credit-card/travel-reward, 2009, 3 pages.
Credit Card Finder: "Reward Credit Cards"; http://www.plasticrewards.com/credit-card/reward/, 2009, 3 pages.
Credit Card Finder: "Hotel Reward Credit Cards"; http://www.plasticrewards.com/credit-card/hotel-reward/, 2009, 2 pages.
CreditCardGuide.com: "Use Cash Back Credit Cards"; http://www.creditcardguide.com/cashback.html/, 2009, 3 pages.
CreditCardGuide.com: "Cash Back Credit Cards"; http://www.creditcardguide.com/cashback2.htmll, 2009, 2 pages.
CreditCardGuide.com: "Use Reward Credit Cards"; http://www.creditcardguide.com/reward-point-credit-cards.html/, 2009, 3 pages.
CreditCardGuide.com: "Gas Rebate Credit Cards"; http://www.creditcardguide.com/gascards.html/, 2009, 2 pages.
CreditCardGuide.com: "With Airline Credit Cards, Frequent Flyer credit cards, and Travel Reward Credit Cards"; http://www.creditcardguide.com/airline-frequent-flyer-cards.html/, 2009,4 pages.
CreditCardGuide.com: "Use hotel reward credit cards and travel reward credit cards"; http://www.creditcardguide.com/hotel-reward-credit-cards.html/, 2009, 2 pages.
CreditCardGuide.com: "Dining and entertainment credit cards"; http://www.creditcardguide.com/dining-entertainment.html/, 2009, 3 pages.
CreditCardGuide.com: "Car rebate credit cards"; http://www.creditcardguide.com/car- rebate.html/, 2009, 2 pages.
CreditCardGuide.com: "Use retail reward credit cards and brand name reward credit cards"; http//www.creditcardguide.com/retail-brand-credit-cards.html/, 2009, 2 pages.
CreditCardGuide.com: "Use home improvement reward credit cards"; http://www.creditcardguide.com/home-improvement-credit-cards.html/, 2009, 2 pages.
CreditCardGuide.com: "Financial reward credit cards"; http://www.creditcardguide.com/financial-reward-credit-cards.html/, 2009, 2 pages.
CreditCardGuide.com: "Foundation and charity credit cards"; http://www.creditcardguide.com/foundations-charities.html/, 2009, 3 pages.
CreditCardGuide.com: "Sports and outdoor enthusiast credit cards"; http://www.creditcardguide.com/sports-outdoors.html/, 2009, 2 pages.
International Patent Application PCT/US2009/058412, International Search Report and Written Opinion, dated May 11, 2010.
International Patent Application PCT/US2009/052766, International Search Report and Written Opinion, dated Mar. 11, 2010.
International Patent Application PCT/US2010/036076, International Search Report & Written Opinion, dated Dec. 30, 2010.
International Patent Application PCT/US2011/029401, International Search Report and Written Opinion,dated Dec. 20, 2011.
International Patent Application PCT/US2011/039051, International Search Report and Written Opinion, dated Feb. 17, 2012.
International Patent Application PCT/US2011/046702, International Search Report and Written Opinion, dated Feb. 28, 2012.
International Patent Application PCT/US2011/052465, International Search Report and Written Opinion, dated Mar. 2, 2012.
International Patent Application PCT/US2012/029273, International Search Report and Written Opinion, dated Oct. 29, 2012.
International Patent Application PCT/US2011/059410 International Search Report and Written Opinion, dated Apr. 11, 2013.
International Patent Application PCT/US2013/022572 International Search Report and Written Opinion, dated Apr. 22, 2013.
International Patent Application PCT/US2013/024421 International Search Report and Written Opinion, dated May 8, 2013.
Li, Wen-Syan, "Knowledge Gathering and Matching in Heterogeneous Databases," Working Notes of the AAAI Spring Symposium on Information Gathering, pp. 116-1216, Mar. 27, 1995.
Mielikäinen, Taneli, "Privacy Problems with Anonymized Transaction Databases," 7th International Conference on Discovery Science, pp. 219-229, Oct. 2, 2004.
Punj, Girish et al. " Cluster Analysis in Marketing Research: Review and Suggestions for Application," Journal of Marketing Research, vol. 20, pp. 134-148, May 1983.
Van Grove, Jennifer, "Are Your Online Video Ads Driving Actual Offline Purchases?", available at http://mashable.com/2009/05/18/video-impact/#, May 18, 2009.

\* cited by examiner

| Template Details 331 | | | | ☒ |
|---|---|---|---|---|
| Type: | ○ Offer | ⦿ Merchant | ○ Issuer | |
| Messaging: | ■ Endpoint | ☐ Consumer Direct | | |
| Rewards: | ☐ Points | ■ POS | ■ Statement Credit | |
| Lifecycle: | ○ Auth | ○ Clearing | ⦿ Auth and Clearing | |
| Priority: | ⦿ Low | ○ Medium | ○ High | |

| Configure Default Message Template 333 | | ☒ |
|---|---|---|
| Message Format: | ○ XML  ⦿ JSON | |
| Substitute Variables: | Variable A / Variable B / ⋮ / Variable X | ≫ › ‹ ≪ |
| Custom Fields: | Name  Value | Add |
| Endpoint URL: | | Test |

FIG. 8

Configure Processing Options 335　　　　　　　　　　　　　　　✕

| Merchant Data: | ⦿ Required | ○ Optional | ○ Never |
| Merchant Group: | ⦿ Required | ○ Optional | ○ Never |
| Card Data: | ○ Required | ⦿ Optional | ○ Never |
| Card Group: | ○ Required | ○ Optional | ⦿ Never |

[ Previous ]　[ Next ]

FIG. 9

Configure Enrollment Options 337　　　　　　　　　　　　　　　✕

| Card Data: | ○ Required | ⦿ Optional | ○ Never |
| Card Group: | ○ Required | ○ Optional | ⦿ Never |

UI Support:　○ Full Enrollment　⦿ API Only　○ Mobile Enrollment

UI Asset URL: [               ]
Virtual Host: [               ]

[ Previous ]　[ Next ]

FIG. 10

Configure Enrollment Options 339

Exposed Services: Service A ... Service G

Substitute Variables: Variable A ... Variable X

Custom Fields: Name | Value | Add

Previous | Next

FIG. 11

Configure Statement Credit Options 341

Exposed Services: Service A ... Service G

Initial Credit Balance: ___ USD

Previous | Next

FIG. 12

SYSTEMS AND METHODS TO PROGRAM A COMPUTING SYSTEM TO PROCESS RELATED EVENTS VIA WORKFLOWS CONFIGURED USING A GRAPHICAL USER INTERFACE

RELATED APPLICATIONS

The present application claims priority to Prov. U.S. Pat. App. Ser. No. 61/976,418, filed Apr. 7, 2014, the entire disclosure of which is hereby incorporated herein by reference.

The present application relates to Prov. U.S. Pat. App. Ser. No. 61/970,177, filed Mar. 25, 2014 and entitled "Systems and Methods to Dynamically Configure Message and Transaction Processing for Loyalty Programs", U.S. Pat. No. 8,359,274, U.S. Pat. App. Pub. No. 2011/0087530, U.S. Pat. App. Pub. No. 2012/0078697, U.S. Pat. App. Pub. No. 2012/0072997, the disclosures of which are hereby incorporated herein by reference.

FIELD OF THE TECHNOLOGY

At least some embodiments of the present disclosure relate to programming a computing device to process data via a graphical user interface in general, and more particularly, but not limited to, programming via workflows identified using a graphical user interface.

BACKGROUND

A modern computing apparatus can be programmed to process complex operations in response to related events, such as transmitting a message in response to an event under certain conditions.

However, programming a computing device generally requires skills in computer programming; and designing a computer program requires domain knowledge in the area of the application of the computing device. It is a time consuming process to design a program, request programmers to code the program, and employ testers to test the coded program, before the coded program can be launched for services.

When the requirements of an application of the computing device change, or a different application is requested, the time and labor intensive operations need to be repeated to program the computing device.

BRIEF DESCRIPTION OF THE DRAWINGS

The embodiments are illustrated by way of example and not limitation in the figures of the accompanying drawings in which like references indicate similar elements.

FIGS. 3-12 illustrate example of a graphical user interface to configure offers and their processing according to one embodiment.

DETAILED DESCRIPTION

At least one embodiment disclosed in the present application provides techniques to use a graphical user interface to configure workflows of preprogrammed autonomous components that can operate independently from each other and thus configure a computing device to process related events without a need for a programmer to write a code to implement the processing logic.

Figure 1:
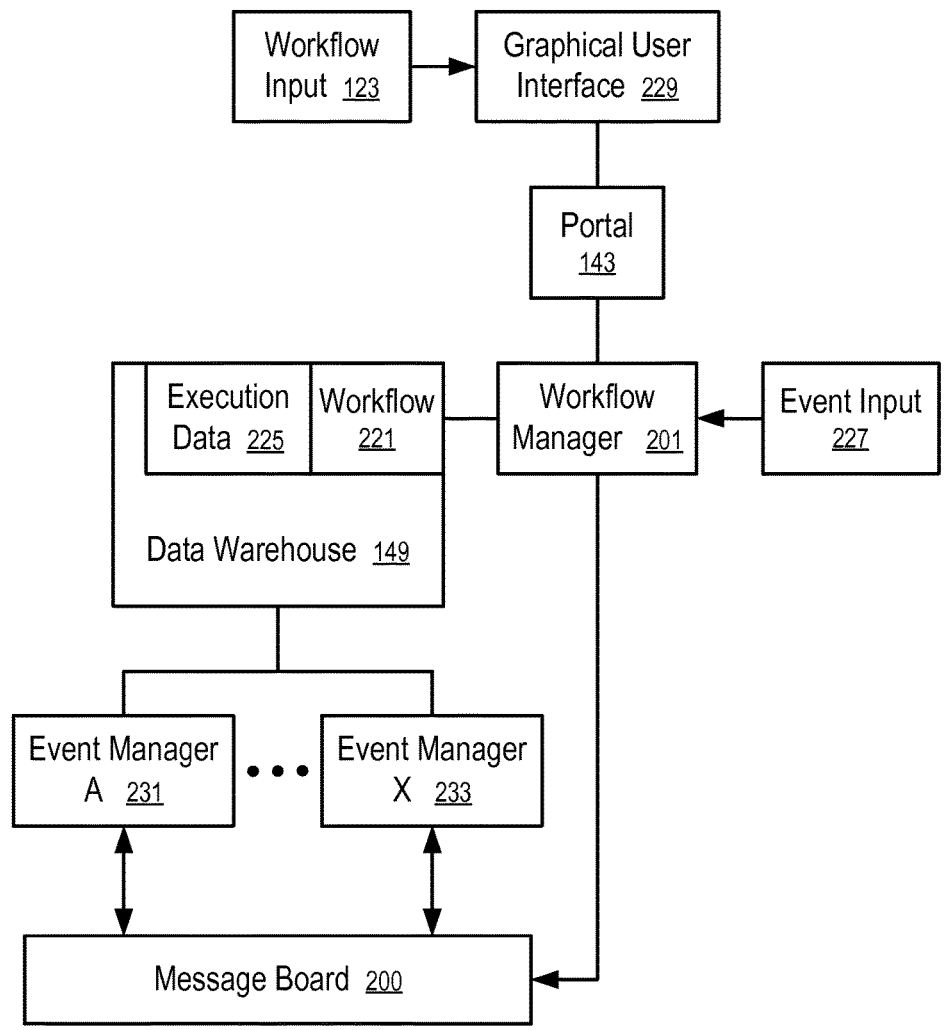
FIG. 1 shows a system configured to program a computing device to process related events according to one embodiment.

FIG. 1 shows a system configured to program a computing device to process related events according to one embodiment.

The system in FIG. 1 includes a portal (143) coupled with a workflow manager (201) to present a graphical user interface (229) configured to receive workflow input (123) from a user defining a workflow (221) of the event managers (231, . . . , 233).

After the workflow input (123) is received in the graphical user interface (229) presented via the workflow manager (201) and the portal (143), the data warehouse (149) stores the data defining the workflow (221) of the event managers (231, . . . , 233).

The system in FIG. 1 includes a plurality of event managers (231, . . . , 233) coupled with the message board (200) and/or the data warehouse (149). Each of the event managers (231, . . . , 233) is configured as an autonomous component that can detect a relevant message on the message board (200), process an event identified by the relevant message without interaction with other autonomous component, and post a message on the message board to provide the processing result.

Each of the event managers (231, . . . , 233) is configured as an autonomous component that processes a predetermined type of events independent of other event managers (231, . . . , 233). Different event managers (231, . . . , 233) processes different types of events.

Each of the event managers (231, . . . , 233) is generally configured to receive input from the message board (200) and provide processing results that may be used by other event managers on the message board (200) and/or the data warehouse (149) as the execution data (225).

In FIG. 1, the flow of operations among the event managers (231, . . . , 233) is defined by the workflow (221); and different users may define different workflows (221) of the event managers (231, . . . , 233) for their respective processing needs.

In FIG. 1, the data warehouse (149) and the message board (200) provide communication channels to allow processing results to flow from one manager to another, in accordance with the workflow (221).

In some embodiments, at least some of the event managers (231, . . . , 233) have other input/output channels different from the data warehouse (149) and the message board (200). The additional input/output channels are configured to meet the specific needs of the respective event managers (231, . . . , 233) and are generally not use for communications among the event managers (231, . . . , 233).

In FIG. 1, the event input (227) is processed by the workflow manager (201) to generate a message posted on the message board (200). The event managers (231, . . . , 233) independently monitor the message boards (200) for messages relevant to respective event managers (231, . . . , 233). After processing the relevant messages independent of other event managers (231, . . . , 233), the respective event managers (231, . . . , 233) provide the respective processing results as messages posted on the message board (200), which messages cause relevant event managers (231, . . . , 233) to further processing the results in accordance with the workflow (221). Certain processing results are stored in the data warehouse (149) as the persistent execution data (225) that can be looked up by the event managers when needed.

For example, in response to an event that has the event input (227), the workflow manager (201) identifies the relevant workflow (221), generates a message identifying the workflow (221) and the event input, and posts the message on the message board (200). The event managers (231, . . . , 233) are configured to periodically check the message board (200) for messages that are relevant to respective event managers (231, . . . , 233). One or more of the event managers (231, . . . , 233) determine that the message generated by the workflow manager (201) needs processing by the one or more of the event managers (231, . . . , 233), retrieve the message, process the message, generate one or more result messages in accordance with the workflow (221), and post the result messages on the message board. The result messages identifying the workflow (221), the processing stage of the workflow (221), and/or the results generated by the respective event managers (e.g., 231, . . . , 233). The result messages are retrieved by relevant event managers according to the workflow (221) for further processing, until the completion of the workflow (221).

Thus, in FIG. 1, the executions of the event managers (231, . . . , 233) are driven by the messages posted on the message board (200), in accordance with the workflow (221).

The arrangement in FIG. 1 greatly simplifies the programming of the processing of a campaign that involves different types of events interconnected via prerequisite conditions, where the prerequisite conditions and the flows of the events are generally different from campaigns to campaigns, based on the preferences and needs of the users.

Using the system of FIG. 1, the users may specify their preferences and needs via the graphical users interface (229) as the workflow input (123). The workflow manager (201) generates the workflows (221) according to the workflow input (123) from the users. Once the workflow (221) is activated, the system can process the related events according to the preferences and needs of the user, without the need to employ programmers to code the processing logic.

The techniques of FIG. 1 can be used in many areas, including the processing of an offer campaign involving different types of events, such as enrollment, payment transaction, rewards, statement credits, notifications, etc.

For example, transaction data, such as records of transactions made via credit accounts, debit accounts, prepaid accounts, bank accounts, stored value accounts and the like, can be processed to optionally provide information for various services, such as reporting, benchmarking, advertising, content or offer selection, customization, personalization, prioritization, offer redemption, loyalty benefit provisioning and/or redemption, etc.

To improve privacy protections, users may be required to enroll in a service program and provide consent to allow the system to use related transaction data and/or other data for the related services, and the system is configured to provide the services while protecting the privacy of the users in accordance with the enrollment agreement and user consent.

For example, based on the transaction data, an advertising network in one embodiment is provided to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers. Some examples of targeted offer delivery are provided in U.S. Pat. No. 8,606,630, entitled "Systems and Methods to Deliver Targeted Advertisements to Audience", the entire disclosure of which is hereby incorporated herein by reference.

For example, the computing apparatus can be configured to generate trigger records for a transaction handler to identify authorization requests that satisfy the conditions specified in the trigger records, identify communication references of the users associated with the identified authorization requests, and use the communication references to target real-time messages at the users in parallel with the transaction handler providing responses to the respective authorization requests. Details in one embodiment regarding the generation and delivery of messages in real-time with the processing of transactions are provided in the section entitled "REAL-TIME MESSAGES", and U.S. Pat. Nos. 8,359,274 and 8,407,148, both entitled "Systems and Methods to Provide Messages in Real-Time with Transaction Processing", the entire disclosures of which are hereby incorporated herein by reference.

For example, the computing apparatus can be programmable for real-time interaction with users to provide messages and/or offers, validate fulfillment conditions, and provide benefits to qualified users to fulfill the offers. In one embodiment, the computing apparatus is configured to be programmed via accepting definitions of independent events and linking the events via prerequisite requirements to specify qualification conditions. The linked events form a flow or network of events; and user progress in the flow or network of events is tracked. The operations for each event are performed in an atomic way to allow the user positions in the flow or network of events to be identified as being in between adjacent events in the network. As a result, the programming of the real-time interaction, including the offer rules and messages, can be easily modified during the execution of the programming. Details in one embodiment regarding the formulation and management of real-time interaction are provided in U.S. Pat. App. Pub. No. 2012/0078697, entitled "Systems and Methods to Program Operations for Interaction with Users", the entire disclosure of which application is hereby incorporated herein by reference.

In one embodiment, the computing apparatus can be configured to include a set of autonomous components coupled together via a messaging system and a workflow for an offer or loyalty program. The processing of different offers or loyalty programs can be programmed via customizing the workflows of the autonomous components and their configuration parameters. When a transaction that may be relevant to an offer or loyalty program is detected, the data about the transaction and other relevant data, including the workflow of the offer or loyalty program and the processing results of relevant components, can be posted on the messaging system for further processing according to the workflow. Thus, the computing apparatus can support the rapid development and deployment of offers or loyalty programs having different structures and rules.

Using a system as illustrated in FIG. 1, a user-friendly graphical interface can be configured to accommodate changing requirements of loyalty/offer businesses. The friendly graphical user interface can accommodate the design, specification, and/or modifications of different loyalty programs of different structures. The graphical user interface receives user input for generating data to configure the processing of transactions relevant to the loyalty program, without the need to write computer codes. For example, the graphical user interface is configured to collect user input regarding parameters and options of the loyalty program, select a workflow template, modify the workflow to define the processing of the loyalty program within RTM, and specify parameters for the workflow. Details and examples are provided further below.

For example, different offers and loyalty programs may have different structures with different processing requirements in response to payment transactions.

For example, the processing of some offers and loyalty programs may involve the notification of transaction information to an offer provider for further processing.

For example, the processing of some offers and loyalty programs may involve the notification of transaction information to an offer provider for the determination of benefits and applying benefits to transactions in response to the response from the offer provider.

For example, the processing of some offers and loyalty programs may involve the provisioning of benefits of the programs, settling the cost of the benefits, and provide notifications to the users receiving the benefits.

For example, the processing of some offers and loyalty programs may involve delivering of offers and/or the management of the user enrollments, but others many not.

For example, the processing of some offers and loyalty programs may involve the inline application of benefits during the authorization of a payment transaction based on predetermined redemption requirements, but may or may not involve notifications to users.

Using the techniques illustrated in FIG. 1, the different types of offers and/or loyalty programs can be configured via the graphical user interface (229) without the need to employ a programmer to write codes in conventional computer programming languages to program the processing logic.

As illustrated in FIG. 1, a messaging system (e.g., 200, implemented using an enterprise service bus) is used to interconnect a set of independent, autonomous components of event managers for implementing loyalty programs via workflows. The messages posted on the enterprise service bus drive the operations of the components according to a workflow that implements the loyalty program. When implementing a loyalty program or offer having a new processing structure, the graphical user interface (229) can be used to simply connect the functions of available components to define a new workflow and specify the configuration parameters of the components for the loyalty program of offer. Depositing the workflow in a repository (e.g., in a predetermined area of the data warehouse (149)) activates the implementation of the loyalty program. The system allows the rapid development and deployment of new loyalty programs or offers in days, instead of months to a year.

Figure 2:
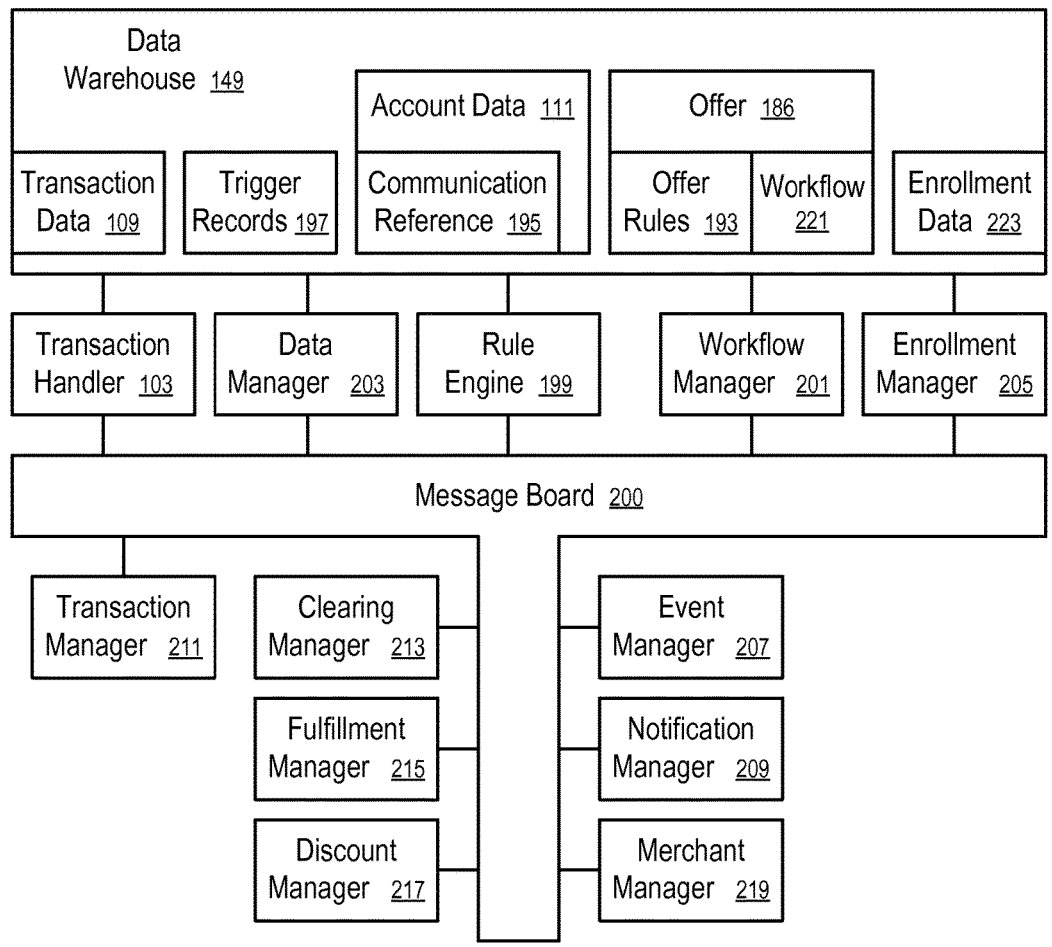
FIG. 2 shows a system configured to allow the dynamic configuration of the processing of offers and loyalty programs having different structures according to one embodiment.

FIG. 2 shows a system configured to allow the dynamic configuration of the processing of offers and loyalty programs having different structures according to one embodiment.

In FIG. 2, the data warehouse (149) is configured to store transaction data (109) of payment transactions processed by the transaction handler (103) and trigger records (197) for identifying transactions that may be of interest for transaction-related services, such as offer/loyalty benefit processing.

In FIG. 2, the data warehouse (149) further stores account data (111) of users, including the account information (142) identifying the consumer account (146) of the user, and the communication reference (195) of the user that may be used for the transmission of notification and/or alert.

In FIG. 2, the data warehouse (149) further stores the offer (186), including the offer rules (193) and the workflow (221) for the processing of the offer (186). In one embodiment, the offer (186) may include a discount offer, an incentive offer, a reward offer, a loyalty benefit redemption offer, and/or a loyalty program offer, etc.

In FIG. 2, the data warehouse (149) further stores enrollment data (223) identifying the enrollment status of users, which associates the offer (186) with the account data (111) of the user who has accepted the offer (186) and/or enrolled in the program associated with the offer (186).

Figure 13:
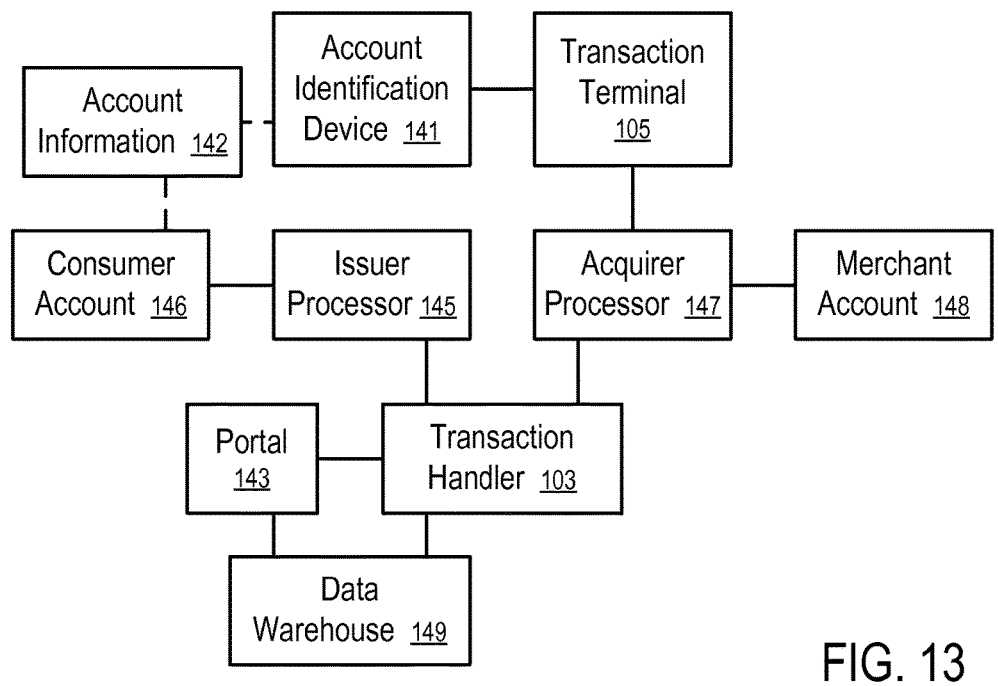
FIG. 13 shows a system to provide information based on transaction data according to one embodiment.

In FIG. 2, the transaction handler (103) is configured to process the payment transactions in a payment network illustrated in FIG. 13 and use the trigger records (197) to identify transactions that satisfy the conditions specified in the trigger records (197) for further actions specified in the respective trigger records (197).

In FIG. 2, the rule engine (199) is configured to evaluate the rules, such as offer rules (193), to determine whether certain conditions are satisfied.

In FIG. 2, the workflow manager (201) is configured to provide a user interface that allows a user to design, modify, generate, and configure the workflow (221). In one embodiment, at least part of the offer rules (193) are configurable via the workflow manager (201).

In one embodiment, the workflow (221) specifies the processing follow by a set of autonomous components configured in the system, such as an enrollment manager (205), a transaction manager (211), a clearing manager (213), a fulfillment manager (215), a discount manager (217), an event manager (207), a notification manager (209), a merchant manager (219), etc.

In one embodiment, each of the autonomous components is configured to process available data independent of other autonomous components and/or the operation sequences of the components.

In FIG. 2, the enrollment manager (205) is configured to manage user-related data, including data registered by other workflow components such as the transaction manager (211) and the notification manager (209)). It may provide a user interface for a customer or a partner to input and manage user-related data, ensure consistent cross-enrollment/registration in peer systems (e.g., as specified in offer settings or as registered by other workflow components such as the transaction manager (211).

In FIG. 2, the data manager (203) is configured to load data from the data warehouse (149) and/or other data sources for the processing of a transaction that is identified to satisfy the requirements of a trigger record (197) in relation with the action specified in the respective trigger record (197).

In one embodiment, after a payment transaction is identified by the transaction handler (103) in accordance with a trigger record (197), the data manager (203) identifies the action specified in the trigger record (197) as being related to the offer (186) and generates a data object that contains the data of payment transaction as being processed by the transaction handler, data identifying the offer (186) including the workflow (221), and relevant context data for the processing of offer (186) and/or the action identified in the trigger record (197).

In one embodiment, the data manager (203) is configured to make the data object available to the autonomous components, such as the transaction manager (211), the clearing manager (213), the fulfillment manager (215), the discount manager (217), the event manager (207), the notification manager (209), the merchant manager (219), etc., and post a message on the message board (200) to allow the autonomous components to further process the transaction using the data object and in accordance with the workflow (221) identified in the data object.

In one embodiment, each of the autonomous components is configured to watch the message board (200) to detect messages that require their services. When a message on the message board (200) requires the service of a respective autonomous component, the respective autonomous component retrieves the message, performs operations in view of the associated data object, updates the data object with results if there is any, and posts a resulting message on the message board (200), which may cause an autonomous component to render its service in accordance with the workflow (221).

In one embodiment, the event manager (207) is configured to store offer metadata, event rules and actions, location repository data, event history of the user in complex event processing, etc. The event manager (207) is further configured to validate, get/set offer metadata, event rules and actions (e.g., by calling downstream systems for action validation), location data, etc.

In one embodiment, the notification manager (209) is configured to store notification templates. User contact details (e.g., communication reference (195) may be stored in user enrollment record (e.g., 223). In one embodiment, the notification system defines what details are required and workflow manager (201) enforces the requirements. The notification manager (209) is configured to process realtime message requests, validate template including substitution of variables, and send messages via proper media channels.

For example, the notification manager (209) may be called by the event manager (207) to validate that a notification template can be assigned to an event based on the event data.

In one embodiment, the transaction manager (211) is configured to coordinate with the transaction handler (103) for the authorization of the payment transaction in view of the data object.

In one embodiment, the clearing manager (213) is configured to coordinate with the transaction handler (103) for the clearing of the payment transaction in view of the data object.

In one embodiment, the fulfillment manager (215) is configured to store/manage the credit balance and other fulfillment data, such as receipt message template, etc. For example, the fulfillment manager (215) may include an application programming interface (API) to manually issue statement credits, and/or an API to update credit balance.

In one embodiment, the discount manager (217) is configured to store discount templates, listen to enrollment and update discount records for the transaction handler (103) as appropriate, register discount trigger templates with the transaction handler (103), and/or maintain a discount timeout queue for discount timeouts.

In one embodiment, the merchant manager (219) is configured to communicate with an API and/or a user interface to manage merchants.

In FIG. 2, an advanced computing infrastructure is provided for implementing, modifying and/or experimenting with offers and/or loyalty programs. Processing of offers and loyalty programs having different structures can be dynamically configured through the customization of workflows.

Figure 16:
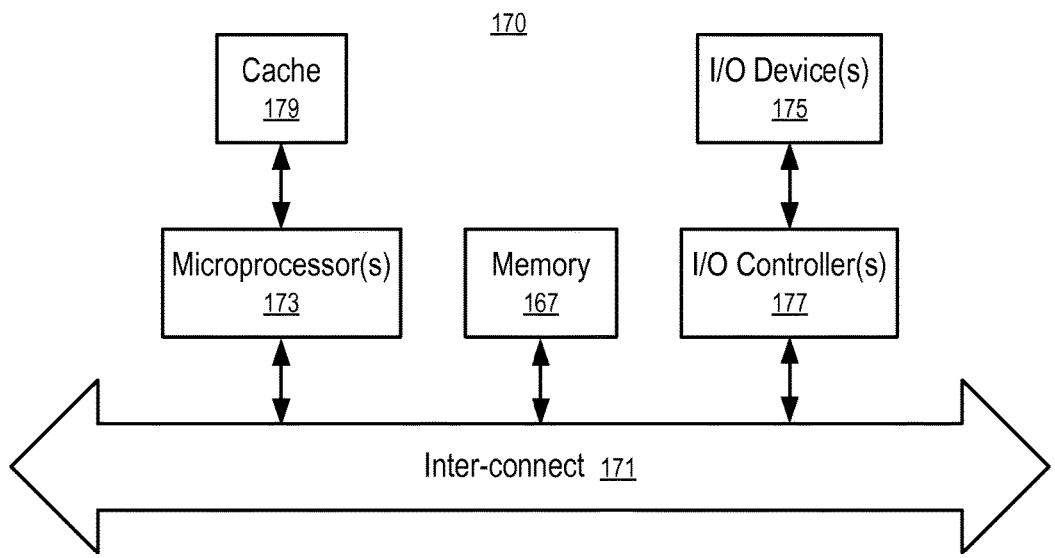
FIG. 16 illustrates a data processing system according to one embodiment.

In one embodiment, the computing apparatus is implemented using at least one data processing system, as illustrated in FIG. 16, having at least one microprocessor (173) and memory (167) storing instructions configured to instruct the at least one microprocessor (173) to perform the operations described herein. The computing apparatus includes at least one of: the data warehouse (149), the transaction handler (103), the data manager (203), the rule engine (199), the workflow manager (201), the enrollment manager (205), the transaction manager (211), the clearing manager (213), the fulfillment manager (215), the discount manager (217), the event manager (207), the notification manager (209), the merchant manager (219), each of which can be implemented using one or more data processing systems illustrated in FIG. 16.

For example, in one embodiment, each of the autonomous components (e.g., event managers (231, . . . , 233)) is implemented on one or more dedicated computers that are not shared with computers used to implement other autonomous components (e.g., event managers (231, . . . , 233)). In another embodiment, each of the autonomous components (e.g., event managers (231, . . . , 233)) is implemented as a virtual machine in a cluster of computers connected via a local area network, where the cluster of computers may be shared for the implementation of different autonomous components (e.g., event managers (231, . . . , 233)).

FIGS. 3-12 illustrate example of a graphical user interface (229) to configure offers and their processing according to one embodiment.

In one embodiment, the graphical user interface (229) is provided via the portal (143) coupled with the data warehouse (149) and implemented in a system illustrated in FIGS. 1 and/or 2.

Figure 3:
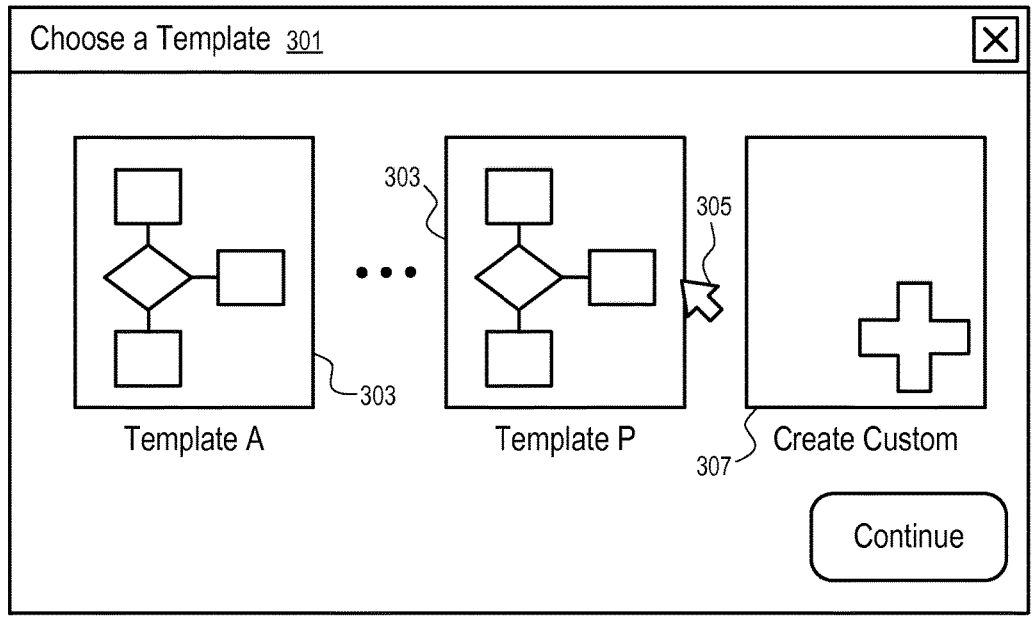

The user interface (301) illustrated in FIG. 3 presents a plurality of workflow templates preconfigured for typical offer campaigns or loyalty programs. The user of the user interface (301) can use the cursor (305) to select one of icons (303) representing the preconfigured workflow templates, or the icon (307) to create a custom workflow.

In one embodiment, each of the predefined workflow templates has predefined processing flows and partner relationships. The user may choose to use the predefined processing flows and partner relationships, or modify the template to generate a custom workflow.

In one embodiment, each of the predefined community templates has a predetermined workflow for a selected set of autonomous components, such as the enrollment manager (205), the transaction manager (211), the clearing manager (213), the fulfillment manager (215), the discount manager (217), the event manager (207), the notification manager (209), etc. illustrated in FIG. 2.

In one embodiment, a custom workflow can be created via a design of the structure and processing flow of the autonomous components selected for the offer or loyalty component.

In one embodiment, different workflows correspond to different templates of offer communities of different structures. The structure differences are reflected in the differences in workflows, e.g., how the processing flow goes from one autonomous components to another.

Different offers or loyalty programs can also be configured using the same workflow template having the same processing flow but different configuration parameters for different offers or loyalty programs.

Figure 4:
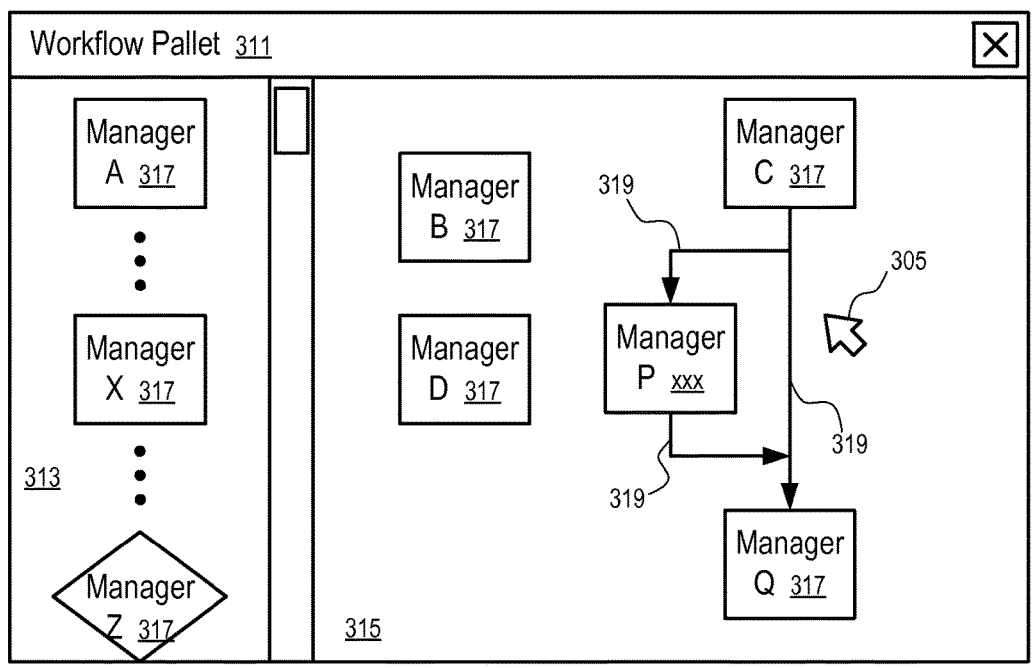

In one embodiment, after the user selects one of the icons (303, 307) in the user interface (301) shown in FIG. 3, a user interface (311) illustrated in FIG. 4 is presented to allow the user to select a set of components for an offer or loyalty program and define the flow of work among the selected set of components.

For example, if the user selects an icon (303) representing a pre-configured workflow, the user interface (311) initially presents the pre-selected set of component icons (317) in the panel (315) with the flow lines (319) illustrating the pre-configured flow directions. The icons of the components not selected in the pre-configured workflow are presented in a separate panel (313).

If the user selects the icon (307) representing a custom workflow, the user interface (311) initially presents no component icons (317) in the panel (315). The icons of all components available for selection into the panel (315) are presented in the panel (313).

In the user interface (311) illustrated in FIG. 4, the user may use the cursor (305) to drag an icon (317) from the icon panel (313) to the workflow panel (315) to add the component represented by the dragged icon (317) into the workflow of the offer or loyalty program. The user may also use the cursor (305) to drag an icon (317) from the workflow panel (315) to the icon panel (313) to remove the component represented by the dragged icon (317) from the workflow of the offer or loyalty program.

In the user interface (311) illustrated in FIG. 4, the user may provide inputs (e.g., drawing lines to connect the icons) to instruct the workflow manager (201) to create flow connections between components (231, . . . , 233) represented by respective icons (317). The flow lines (319) can be adjusted, changed, added, and/or deleted in the panel (315) to specify or customize the workflow.

In some embodiments, some of the components may not necessarily be connected to other components via flow lines. Such components may process relevant events without the prerequisite of the result of other components.

Figure 5:
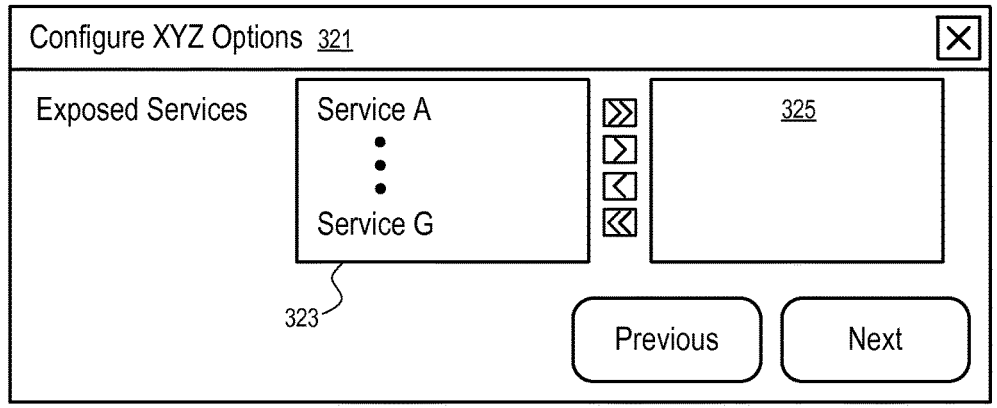

In one embodiment, each of the icons (317) presented in the panel (315) in FIG. 4 can be selected to request user interfaces (e.g., 321) as illustrated in FIG. 5 to configure the options of the component represented by the selected icon (317).

In some embodiments, a custom workflow having a unique flow structure as defined in the panel (315) can be saved as a template, represented in the user interface (303) as a template icon (303).

In some embodiments, when a template workflow (e.g., represented by the icon (303)) is selected in a configuration wizard, the wizard presents the configuration interfaces for the components used in the workflow, one after another, to configure the components.

Figure 6:
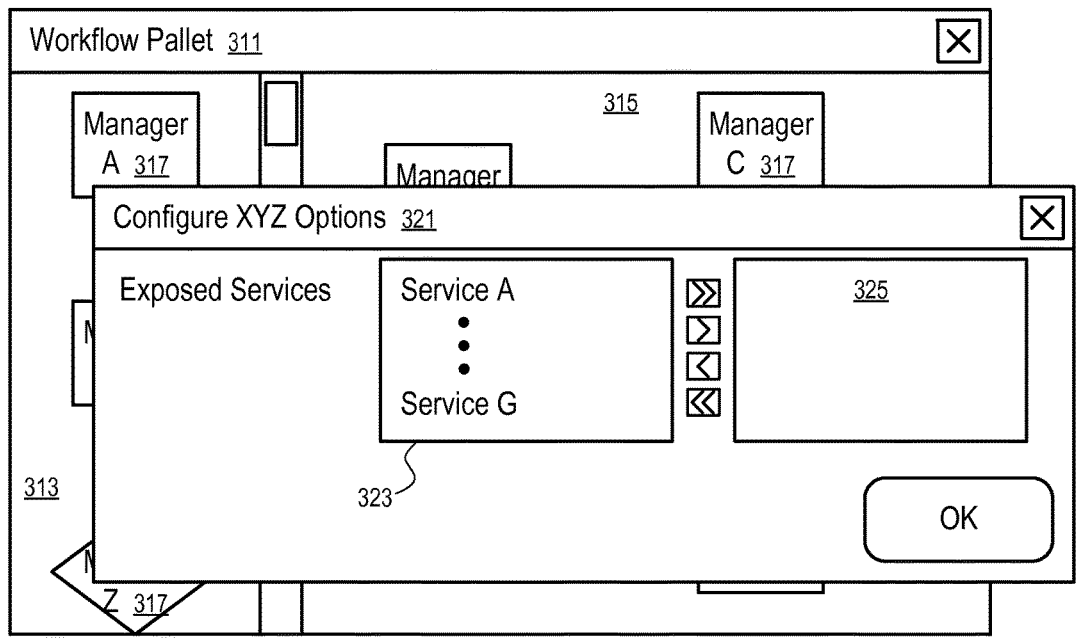

In one embodiment, the cursor (305) can be used to select an icon (319) in the panel (315) to invoke a user interface (321) (e.g., via double-click, right-click, select to highlight and apply a menu option to configure options) in a way as illustrated in FIG. 6.

In FIG. 5 or 6, the user interface (321) includes a list (323) of available services that can be selected into the list (325) of exposed services. Each of the services represents one of a plurality of computing services offered by the component associated with the user interface (321). Exposing a service of the component represents the configuration of the component to actually provide the service; and the services not selected as exposed services are not actually provided by the component during the execution of the workflow.

For example, the user interface (311) illustrated in FIG. 4 can be used to edit a workflow of an offer involving a community of participants. In FIG. 4, the workflow panel (315) may show the arrangement/connection of autonomous components used in the processing of the offer community, such as the transaction manager (211), the clearing manager (213), the notification manager (209), the enrollment manager (205), the discount manager (217), the fulfillment manager (215), for a workflow of the offer campaign.

Some of the components selected in the workflow panel (315), such as the enrollment manager (205), the discount manager (217), the fulfillment manager (215), can be used in the workflow without connections with others. Such components are used when appropriate trigger conditions are satisfied, without requiring invoking other components to process the results these components.

Some of the components selected in the workflow panel (315), such as the transaction manager (219), the clearing manager (213), and the notification manager (209), are connected in the workflow via flow lines (319). In the connected part of the workflow, a subsequent component (e.g., the clearing manager (213), the notification manager (209)) is invoked to process the result of the prior component (e.g., the transaction manager (211)).

In some embodiments, the user interface (311) of FIG. 4 includes tools usable by the user to arrange the connectivity among the autonomous components, such as adding a flow line to represent a workflow connection between two components, deleting a flow line connection between two components, changing the components connected by a flow line, etc.

For example, the icon of the event manager (207) can be selected from the icon panel (313) into the workflow panel (315) in FIG. 4 and inserted after the icon of the transaction handler (211) in the processing flow to obtain a modified workflow.

The collection of autonomous components in a relationship represented by the workflow connections (and/or the lack of the workflow connections among some of them) represents the processing workflow (221) of the offer community. Data representing the processing workflow (221) is stored as the data warehouse (149) for the offer (186) corresponding to the offer community that may involve a participating merchant, a population of enrolled customers, one or more issuers, loyalty providers, etc.

In one embodiment, web services provided by the autonomous components can also be used via selecting and configuring the individual components displayed in the workflow panel (315) in FIG. 4. The configurations of the web services can be exported to a file in a Web Service Definition Language (WSDL) (e.g., via the selection of an "Export WSDL" button provide in some embodiments.)

In one embodiment, the exported WSDL file providing the configurations of the web services specifies the web communication protocols between the component and a web application of the user such that when the web application is implemented in accordance with the WSDL file, the component can communicate correctly with the web application of the user of the graphical user interface (229).

For example, the option configuration interface (311) for the event manager (207) can be configured to the selection of exposed services from a set (323) of available services, such as saveOffer, saveOfferMetadata, saveEvent, cancelEvent, updateEvent.

After the selection, creation, and/or customization of a workflow template and the global parameters for an offer or loyalty program, a configuration wizard can be used to lead the user to configure the options or settings of the individual components used in the workflow to create a workflow for the offer or loyalty program.

In one embodiment, a wizard is configured to walk the user though setting up a loyalty community and allows the user to customize settings for the community and enable advanced system features. In another embodiment, the user may customize the individual components via inspecting individual components selected in the workflow panel (315).

FIG. 7 shows an example of a user interface (331) to configure the global parameters of an offer or loyalty program. In FIG. 7, the user is provided with selectable options related to the type of the offer/loyalty program, the messaging model of the offer/loyalty program, the mode of reward processing, the stages of a transaction lifecycle involved in the offer/loyalty program, the processing priority of the offer/loyalty program, etc.

FIG. 8 illustrates a user interface (333) for the configuration of the default message template, such as the message format, and the substitution variables.

For example, FIG. 8 illustrates the configuration of a default message template. The message template may use one or more substitution variables, such as TransactionDateTime, TransactionAmount, ServiceKey, MerchantName, etc. The user may also create custom fields for variable substitution. The variables used in the message template will be substituted by the actual values of the variables for the corresponding transaction when generating the real time message by the rule engine (199), the data manager (203), and/or the respective event managers (231, . . . , 233).

In some embodiments, the user interface may provide a user interface element selected to present the source code for the configuration of the variables substitution, which provides a more flexible user interface for advanced configuration of the notification manager (209) that generates notification messages for the offer/loyalty program.

FIG. 9 illustrates a user interface (335) for the configuration of transaction processing options. For example, the user may indicate that during the processing of the transactions, whether certain data (e.g., merchant data, merchant group, payment card data, payment card product group) is required, optional, or never used. The processing options identify the data used and/or processed by the transaction manager (211) in the offer/loyalty program for improved efficiency and execution speed.

FIG. 10 illustrates a user interface (337) for the configuration of enrollment options, such as whether, during the enrollment, certain data (e.g., card data, card product group data) is required, optional, or never used. The user may select an option to support full enrollment, mobile enrollment and/or API based enrollment.

FIG. 11 illustrates a user interface (339) for further configuration of the enrollment manager (205). For example, the user enrollment for the community may require a number of exposed services, such as "Enroll/Unenroll", "Update Enrollee", "Add/Remove Card", "Update Card", etc. In some embodiments, the exposed services of different event managers (231, . . . , 233)/components (207, . . . 219) can be exported in to a single WSDL file at the end of the configurations of managers/components.

For example, the enrollment communication may require variable substitutions for fields, such as FirstName, LastName, BilllingZip, City, State of the enrollee.

In FIG. 11, the user interface (339) further allows the user to define custom fields used in enrollment communication, and indication of whether the custom fields are option or required.

In one embodiment, a user interface for the configuration of notification manager (209) allows the selection of options to export services via SMS, email, and/or service notification.

If the offer community is configured to provide offer benefits via statement credits, FIG. 12 illustrates a user interface (341) for the configuration of statement credit options for the discount manager (217), such as the use of sendStatementCredit service, the initial credit balance for use with the statement credits.

If the offer community is configured to provide benefit that can be redeemed while the transaction is being processed at the transaction terminal, a similar user interface is presented for the configuration of the use of services, such as saveDiscountTemplate, and activateDiscount.

If the offer community is configured to involve event manager (207), a user interface is presented for the configuration of the use of relevant services, such as saveOffer, saveOfferMetaData, saveEvent, cancel Event, and updateEvent.

In one embodiment, after the user finishes configuring the offer community, a user interface is presented to offer the user exporting the configured web services into a Web Service Definition Language (WSDL) file.

In one embodiment, the configuration of the community identifies a set of web services of the portal (143) and/or the media controller for communication with partners (e.g., issuers, merchants, benefit sponsors). The exported configuration of the web services in a Web Service Definition Language (WSDL) allows the partners to configure their computing systems for communication with the portal (143) and/or the media controller.

In one embodiment, the event managers (231, . . . , 233) include at least a transaction manager (211) configured to process the transaction data from a transaction handler of an electronic payment processing network, as illustrated in FIG. 13.

In one embodiment, a data warehouse (149) as illustrated in FIG. 13 is coupled with the transaction handler (103) to store the transaction data (109) and other data, such as account data (111), transaction profiles and correlation results. In FIG. 13, a portal (143) is coupled with the data warehouse (149) to provide data or information derived from the transaction data (109), in response to a query request from a third party or as an alert or notification message.

In FIG. 13, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user and the merchant.

Figure 14:
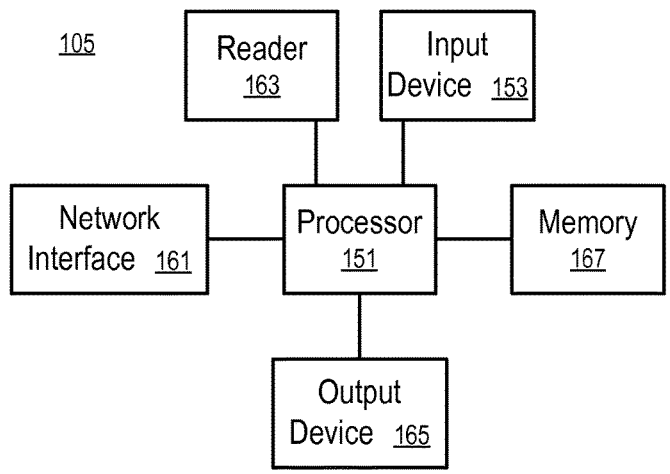
FIG. 14 illustrates a transaction terminal according to one embodiment.
Figure 15:
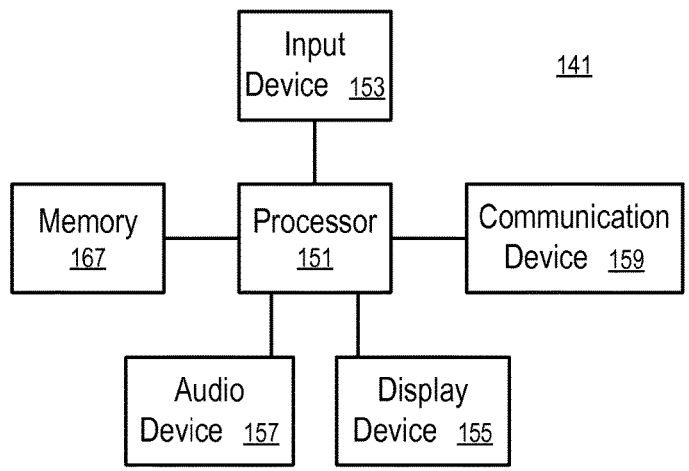
FIG. 15 illustrates an account identifying device according to one embodiment.

FIGS. 14 and 15 illustrate examples of transaction terminals (105) and account identification devices (141). FIG. 16 illustrates the structure of a data processing system (170) that can be used to implement, with more or fewer elements, at least some of the components in the system. Some embodiments use more or fewer components than those illustrated, such as, in FIGS. 1, 2, 13-16, and other figures.

For example, the system as described above can be used to provide a user-friendly interface to accommodate changing requirements of offer campaigns and/or loyalty programs. The friendly user interface allows inputs to design, specify, and/or modify a loyalty program via a graphical user interface and generate data to configure processing of transactions relevant to the loyalty program, without the need for programmers to write computer codes. The graphical user interface is configured to collect user input regarding parameters and options of the loyalty program, select a workflow template, modify the workflow to define the processing of the loyalty program within RTM, and specify parameters for the workflow. As a result, new loyalty programs may be quickly implemented and/or modified for improvements.

Transaction Processing and Data

FIG. 13 shows a system to provide information and/or services based on transaction data (109) according to one embodiment.

In FIG. 13, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records, such as the transaction profiles, aggregated spending profile, offer redemption notification, etc. The portal (143) may be implemented as a web portal, a telephone gateway, a file/data server, etc.

In FIG. 13, the transaction terminal (105) initiates the transaction for a user (e.g., a customer) for processing by a transaction handler (103). The transaction handler (103) processes the transaction and stores transaction data (109) about the transaction, in connection with account data (111), such as the account profile of an account of the user. The account data (111) may further include data about the user, collected from issuers or merchants, and/or other sources, such as social networks, credit bureaus, merchant provided information, address information, etc. In one embodiment, a transaction may be initiated by a server (e.g., based on a stored schedule for recurrent payments).

The accumulated transaction data (109) and the corresponding account data (111) are used to generate intelligence information about the purchase behavior, pattern, preference, tendency, frequency, trend, amount and/or propensity of the users, as individuals or as a member of a group. The intelligence information can then be used to generate, identify and/or select targeted advertisements for presentation to the user on the point of interaction, during a transaction, after a transaction, or when other opportunities arise.

In FIG. 13, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user through a web connection. In one embodiment, the user may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 13, the transaction handler (103) uses the data warehouse (149) to store the records about the transactions, such as the transaction records or transaction data (109).

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services. The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 13, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 13, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user to organize the transactions in one or more consumer accounts (146) of the user with one or more issuers. The user may organize the transactions using information and/or categories identified in the transaction records, such as merchant category, transaction date, amount, etc. Examples and techniques in one embodiment are provided in U.S. Pat. App. Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. Pat. App. Pub. No. 2009/0048884, and entitled "Merchant Benchmarking Tool," the disclosure of which application is hereby incorporated herein by reference.

Transaction Terminal

FIG. 14 illustrates a transaction terminal according to one embodiment. The transaction terminal (105) illustrated in FIG. 14 can be used in various systems discussed in connection with other figures of the present disclosure. In FIG. 14, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 14. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 14. For example, in one embodiment, the transaction terminal (105) is an ATM machine, which includes components to dispense cash under certain conditions.

Account Identification Device

FIG. 15 illustrates an account identifying device according to one embodiment. In FIG. 15, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 15, such as a cellular communications subsystem.

In one embodiment, the communication device (159) may access the account information (142) stored on the memory (167) without going through the processor (151).

In one embodiment, the account identification device (141) has fewer components than those illustrated in FIG. 15. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Hardware

In one embodiment, a computing apparatus is configured to include some of the components of systems illustrated in various figures, such as the transaction handler (103), the portal (143), the event managers (231, . . . , 233), and their associated storage devices, such as the data warehouse (149).

In one embodiment, at least some of the components illustrated in FIGS. 1, 2 and 13 can be implemented as a computer system, such as a data processing system (170) illustrated in FIG. 16. Some of the components may share hardware or be combined on a computer system. In one embodiment, a network of computers can be used to implement one or more of the components.

Further, the data illustrated in the figures, such as transaction data (109), account data (111), transaction profiles, and advertisement data, can be stored in storage devices of one or more computers accessible to the corresponding components. For example, the transaction data (109) can be stored in the data warehouse (149) that can be implemented as a data processing system illustrated in FIG. 16, with more or fewer components.

In one embodiment, the transaction handler (103) is a payment processing system, or a payment card processor, such as a card processor for credit cards, debit cards, etc.

FIG. 16 illustrates a data processing system according to one embodiment. While FIG. 16 illustrates various components of a computer system, it is not intended to represent any particular architecture or manner of interconnecting the components. One embodiment may use other systems that have fewer or more components than those shown in FIG. 16.

In FIG. 16, the data processing system (170) includes an inter-connect (171) (e.g., bus and system core logic), which interconnects a microprocessor(s) (173) and memory (167). The microprocessor (173) is coupled to cache memory (179) in the example of FIG. 16.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/ or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
providing, in a computing apparatus, a plurality of autonomous components;
providing, in the computing apparatus, a message board;
wherein each of the autonomous components operates independently from each other to process a pre-determined type of events via:
monitoring the message board to retrieve a message that the autonomous component is configured to detect;
retrieving the message from the message board independent of the message board itself and other autonomous components;
processing the message in the computing apparatus to generate processing results; and
providing the processing results via result messages posted on the message board;
providing, via the computing apparatus, a graphical user interface;
receiving, in the graphical user interface, a workflow input, the workflow input selecting a subset of the plurality of autonomous components, and specifying a flow among the subset of autonomous components;
generating, by the computing apparatus, a workflow from the workflow input;
storing, in the computing apparatus, the workflow;
receiving, in the computing apparatus, event inputs associated with events of predetermined types corresponding to predetermined types of the autonomous components; and
posting, in the message board, initial messages each identifying the workflow and a respective event input;
wherein the plurality of autonomous components independently monitor check the message board to detect messages that require services associated with the plurality of autonomous components and, in response to detecting the messages, process initial messages in accordance with the workflow, generate result messages, and post the result messages on the message board for further processing in accordance with the workflow.

2. The method of claim 1, wherein the graphical user interface includes a workflow panel configured to present icons representing the subset of autonomous components, and receive user input defining flow directions among the subset of autonomous components.

3. The method of claim 2, wherein the graphical user interface further includes an icon panel showing icons of autonomous components that can be selected into the workflow panel as part of the workflow.

4. The method of claim 3, wherein at least a portion of the icons of autonomous components are connected via flow lines in defining the workflow.

5. The method of claim 4, wherein at least one autonomous component in the subset is not connected via a flow line to other autonomous components in the workflow panel.

6. The method of claim 1, wherein the workflow input includes a user selection of configuration options for a first autonomous component in the subset.

7. The method of claim 6, wherein the user selection of the configuration options includes one or more selections of exposed services of the first autonomous component.

8. The method of claim 7, further comprising:
presenting a user interface element selectable to export the exposed services into a web service definition language file.

9. The method of claim 6, wherein the user selection of the configuration options includes one or more selections of substitute variables in an output of the first autonomous component.

10. The method of claim 6, wherein the user selection of the configuration options includes one or more specifications of custom data fields in an output of the first autonomous component.

11. The method of claim 6, wherein the user selection of the configuration options includes one or more selections of data objects provided by the first autonomous component.

12. The method of claim 6, wherein the first autonomous component is a transaction manager configured to produce a data object containing data of a payment transaction processed by a transaction handler in an electronic processing network in which the transaction handler interconnects one or more issuers and one or more acquirers.

13. The method of claim 6, wherein the first autonomous component is an enrollment manager configured to process enrollment of a customer in an offer or loyalty program defined by the workflow.

14. The method of claim 6, wherein the first autonomous component is a notification manager configured to deliver a notification message to a customer in accordance with the workflow.

15. The method of claim 6, wherein the first autonomous component is a discount manager configured to provide a discount to a payment transaction of a customer enrolled in an offer defined by the workflow.

16. A non-transitory computer storage medium storing instructions configured to instruct a computing apparatus to perform a method, the method comprising:
providing, in the computing apparatus, a plurality of autonomous components, wherein each of the autonomous components operates independently from each other to process a pre-determined type of events;
providing, in the computing apparatus, a message board;
monitoring the message board to retrieve a message that the autonomous component is configured to detect;
retrieving the message from the message board independent of the message board itself and other autonomous components;
processing the message in the computing apparatus to generate processing results; and
providing the processing results via result messages posted on the message board;
providing, via the computing apparatus, a graphical user interface;
receiving, in the graphical user interface a workflow input, the workflow input selecting a subset of the plurality of autonomous components, and specifying a flow among the subset of autonomous components;
generating, by the computing apparatus, a workflow from the workflow input;
storing, in the computing apparatus, the workflow;
receiving, in the computing apparatus, event inputs associated with events of predetermined types corresponding to predetermined types of the autonomous components; and
posting, in the message board, initial messages each identifying the workflow and a respective event input;
wherein the plurality of autonomous components independently monitor chock the message board to detect messages that require their services associated with the plurality of autonomous components and, in response to detecting the messages, process initial messages in accordance with the workflow, generate result messages, and post the result messages on the message board for further processing in accordance with the workflow.

17. A computing apparatus, comprising:
one or more computers configured as a plurality of autonomous components;
a message board coupled to the one or more computers;
wherein each of the autonomous components operates independently from each other to process a pre-determined type of events via:
monitoring the message board to retrieve a message that the autonomous component is configured to detect;
retrieving the message from the message board;
processing the message in the computing apparatus to generate processing results; and
providing the processing results via result messages posted on the message board;
a portal configured to provide a graphical user interface and receive, in the graphical user interface a workflow input, the workflow input selecting a subset of the plurality of autonomous components, and specifying a flow among the subset of autonomous components; and
a data warehouse configured to store a workflow generated from the workflow input;
wherein in response to event inputs associated with events of predetermined types corresponding to predetermined types of the autonomous components, the message board hosts initial messages each identifying the workflow and a respective event input, and the plurality of autonomous components independently monitor the message board to detect messages that require their services, process initial messages in accordance with the workflow, generate result messages, and post the result messages on the message board for further processing in accordance with the workflow.

18. The computing apparatus of claim 17, wherein the one or more computers includes a plurality of computers connected via a network; and each of the plurality of autonomous components is implemented on at least a separate one of the plurality of computers.

19. The computing apparatus of claim 17, wherein the graphical user interface includes a first panel showing icons of autonomous components selectable to be part of the workflow; and a second panel showing icons of autonomous components selected as part of the workflow and flow lines identifying flow directions among the autonomous components.

20. The computing apparatus of claim 17, wherein the subset of autonomous components includes a transaction manager configured to generate payment transaction data objects corresponding to payment transactions processed by a transaction handler of an electronic payment processing network, wherein the transaction manager is configured to receive transaction inputs from the transaction handler, generate the transaction data objects, and provide the transaction data objects for further processing by other autonomous components in the computing apparatus via posting messages in the message board.

* * * * *